United States Patent Office 3,318,900
Patented May 9, 1967

3,318,900
DERIVATIVES OF BENZIMIDAZOLINYL PIPERIDINE
Paul Adriaan Jan Janssen, Vosselaar, near Turnhout, Belgium, assignor to Janssen Pharmaceutica N.V., a corporation of Belgium
No Drawing. Filed May 6, 1964, Ser. No. 365,528
13 Claims. (Cl. 260—294)

This invention relates to a new series of organic compounds. More particularly, it concerns certain benzimidazolinyl piperidines and the therapeutically active non-toxic acid addition salts thereof.

The novel benzimidazolinyl piperidines of this invention may be represented by the following formula:

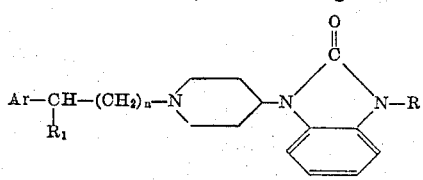

wherein R is a member selected from the group consisting of hydrogen, lower alkyl, lower alkyl-carbonyl, hydroxymethyl, halomethyl, lower alkoxymethyl, cyanomethyl, cyano-Z- and lower alkoxy-carbonyl-Z-, said -Z- being a —$CH(R_2)CR(R_2)$— radical wherein $R_2$ is a member selected from the group consisting of hydrogen and methyl; $R_1$ is a member selected from the group consisting of hydrogen, methyl, ethyl and propyl; and $n$ is an integer from 0 to 4. In the above formula, Ar represents an aryl radical selected from the group consisting of phenyl; halophenyl, preferably chlorophenyl and fluorophenyl; lower alkylphenyl, preferably methylphenyl; and lower alkoxyphenyl, preferably methoxyphenyl.

As used herein, lower alkyl and lower alkoxy may be straight or branch-chained and have from 1 to 5 carbon atoms, such as, for example, methyl, ethyl, propyl, isopropyl, butyl, isobutyl, tertiary-butyl, pentyl and the like, and the corresponding methoxy, ethoxy, propoxy, isopropoxy, butoxy, etc.

Depending upon the conditions employed during the course of the reaction, the novel compounds of this invention are obtained either in the form of the free bases or salts thereof. The salts are converted to the free bases in the usual manner, e.g., by reaction with alkali such as sodium or potassium hydroxide. The compounds in base form may be converted to their therapeutically useful acid addition salts by reaction with an appropriate acid, as, for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicyclic, p-aminosalicylic, 2-phenoxybenzoic or 2-acetoxy benzoic acid.

The compounds of this invention are central nervous system depressants. The compounds have been shown to possess one or more of the following pharmacological properties: analgesic activity, mydriatic activity, anti-apomorphine-induced emetic activity, anti-strychnine activity, hypnotic and neuroleptic activity.

Morphine-like, analgesic activity is particularly observed in the subject compounds when $n$ is zero and $R_1$ is hydrogen or, preferably, methyl, ethyl or propyl. This analgesic activity is illustrated in mice by the hot plate test of Eddy et al. [J. Pharmacol., 107, 385 (1953) and 110, 135 (1954)] mydriatic activity, and observation of a positive Straub phenomenon. This activity is observable both at oral and subcutaneous administration of the drugs. In contrast, the closest known compound in the art, namely, N-benzyl-4-(2-oxo-1-benzimidazolinyl)-tetrahydropyridine, reported by Rossi et al., Helv. Chim. Acta, 43, 1306 (1960), is devoid of such analgesic activity.

Neuroleptic activity is particularly observed in the subject compounds when $R_1$ is hydrogen and $n$ is an integer from 1 to 4. This neuroleptic activity is illustrated by inhibition of learned avoidance escape behaviour in rats and dogs. Inhibition of apomorphine-induced vomiting in dogs is also observable with these compounds.

Hypnotic activity is particularly observed in those compounds wherein $R_1$ is methyl, ethyl or propyl and $n$ is an integer from 1 to 4. This hypnotic activity is illustrated by the loss of the righting reflex in mice. These latter compounds also exhibit potent anti-strychnine activity in rats.

The compounds of this invention, particularly those wherein R is other than lower alkyl-carbonyl, may be obtained by reacting a compound of the formula:

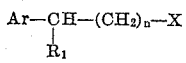

wherein $n$, Ar and $R_1$ are as previously defined and X stands for a reactive ester of the corresponding alcohol with a strong inorganic or organic acid, such as, for example, hydrochloric acid, hydrobromic acid, sulfuric acid, para toluenesulfonic acid, methanesulfonic acid and the like, with the appropriate 4-(2-oxo-1-benzimidazolinyl)-piperidine in an inert organic solvent under, preferably, reflux conditions. When X is chloro or bromo, the reaction is most advantageously conducted in the presence of a halogen acid acceptor, for example, sodium carbonate and organic tertiary amines such as the trialkylamines, e.g., triethyl amine, tributyl amine, etc.; heterocyclic amines, e.g., N-alkyl piperidine, N-alkyl morpholine, pyridine, quinoline, etc.; and dialkyl aromatic amines, e.g., diethyl aniline, dimethyl aniline, etc., to bind the halogen acid that is liberated during the course of the reaction. The amount of halogen acid acceptor that may be employed is not critical, but, for optimum conditions, the theoretical number of moles of halogen acid liberated during the course of the reaction can easily be calculated from the quantities of reactants employed and, thus, the corresponding amount of halogen acid acceptor that need be employed can readily be determined. Among the organic solvents that are operable herein are aromatic hydrocarbons such as toluene, benzene, xylene and the like; lower aliphatic alcohols such as methanol, ethanol and the like; and aliphatic ketones such as acetone, butanone, 4-methyl-2-pentanone and the like.

Introduction of a hydroxymethyl group at the 3-position of the benzimidazoline moiety may be effected by treatment of the desired benzimidazolinone of this invention wherein R is hydrogen, i.e., the 3-position on the benzimidazolyl function is unsubstituted, with formaldehyde under reflux conditions in the presence of a suitable water-organic solvent, e.g., an aqeuous solution of formaldehyde and methanol, ethanol, isopropanol, dioxane, benzene, toluene, etc.

The compounds of this invention, wherein R is lower alkyl-carbonyl, may be prepared by acylation of the corresponding benzimidazolinone which is unsubstituted in the 3-position, i.e., where R is hydrogen. The reaction may be carried out by heating such unsubstituted benzimidazolinones, preferably under reflux conditions, with an appropriate acylating agent such as the anhydride of a lower aliphatic acid, e.g., acetic anhydride, propionic anhydride, n-butyric anhydride, isobutyric anhydride, valeric anhydride, caproic anhydride and the like. Lower carboxylic acid halogenides may also be used advantageously as the acylating agent, e.g., acetyl chloride, butyryl chloride, isobutyryl chloride, valeryl chloride and the like. The acylating reaction may be carried out in a variety of anhydrous non-hydroxylic solvents such as benzene, toluene, chloroform, methylene chloride, tetrahydrofuran, diethyl-ether, etc.

Introduction of a lower alkyl group in the 3-position of the benzimidazolinyl moiety is accomplished by treatment of the corresponding 3-unsubstituted benzimidazolinone with the appropriate alkylating agent, such as a lower alkyl halide or, if a methyl group is desired, a phenyltrimethylammonium halide, such as the bromide, iodide or chloride, in the presence of a strong base, e.g., sodium amide, under reflux conditions in a suitable inert organic solvent such as the aromatic hydrocarbons, e.g., benzene, toluene, xylene and the like.

Replacement of the hydroxy function in the 3-(hydroxymethyl)-substituted benzimidazolinyl moiety with a halogen is suitably effected by treatment with a sulfur or phosphorous oxyhalide as, for example, phosphorousoxychloride or, preferably, thionyl chloride, at temperatures generally at or below room temperature to yield the corresponding 3-(halomethyl)-substituted benzimidazolinyl piperidines of this invention. Treatment of the resulting halogenated derivative with the appropriate alkali earth metal or alkali metal salt of a lower alkanol in the presence of a solvent suitable for such alkoxide, e.g., a lower alkanol, under reflux conditions, causes formation of the corresponding ether function, i.e., a lower alkoxy-methyl group then resides in the 3-position of the benzimidazolinyl moiety.

Cyano-Z- groups, wherein -Z- represents a

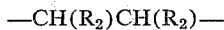

radical in which each $R_2$ stands for hydrogen or methyl, may be introduced into the 3-position of the benzimidazolinone moiety by treating the corresponding 3-unsubstituted benzimidazolinone with the appropriate α-β-unsaturated nitrile, i.e., acrylonitrile, α-methyl acrylonitrile, crotononitrile or 2-methyl-2-butene-nitrile in a suitable inert organic solvent, e.g., anhydrous tetrahydrofuran, 1,4-dioxane, etc., in the presence of a strong base such as sodium alkoxide or a quaternary ammonium hydroxide, e.g., trimethylbenzylammonium hydroxide or triethylbenzylammonium hydroxide. The 3-(cyanomethyl)-substituted benzimidazolinyl piperidines of this invention may be prepared by treatment of the corresponding 3-(halomethyl)-substituted benzimidazolinyl piperidine with an alkali cyanide, e.g., potassium cyanide, thereby effecting replacement of the halo group with a cyano group.

Introduction of lower alkoxy-carbonyl-Z- in the 3-position of the benzimidazolinone moiety, wherein -Z- is as heretofore described, is accomplished by treatment of the corresponding 3-unsubstituted benzimidazolinone with a lower alkyl ester, preferably the methyl or ethyl ester, of the apropriate α,β-unsaturated carboxylic acid, i.e., a lower alkyl ester of acrylic acid, methacrylic acid, crotonic acid and 2-methyl-2-butenoic acid, in a suitable inert organic solvent, e.g., anhydrous tetrahydrofuran, 1,4-dioxane, etc., in the presence of a strong base such as sodium alkoxide or a quaternary ammonium hydroxide.

The following compounds represent the most preferred species of this invention:

1-[1-(4-chloro-phenyl)-ethyl]-4-[3-(2-cyano-ethyl)-2-oxo-1-benzimidazolinyl]-piperidine hydrochloride;
1-(1-phenyl-butyl)-4-(2-oxo-1-benzimidazolinyl)-piperidine;
1-[1-(4-methyl-phenyl)-ethyl]-4-(2-oxo-1-benzimidazolinyl)-piperidine oxalate;
1-(1-phenyl-ethyl)-4-(2-oxo-1-benzimidazolinyl)-piperidine;
1-[4-(4-fluoro-phenyl)-butyl]-4-(2-oxo-1-benzimidazolinyl)-piperidine hydrochloride;
1-(4-phenyl-butyl)-4-(2-oxo-1-benzimidazolinyl)-piperidine;
1-(2-phenyl-propyl)-4-(2-oxo-1-benzimidazolinyl)-piperidine; and
1-[2-(4-fluoro-phenyl)-propyl]-4-(2-oxo-1-benzimidazolinyl)-piperidine oxalate.

The following examples are intended to illustrate, but not to limit, the scope of the present invention. Unless otherwise stated, all parts are by weight.

Example I

To a refluxing mixture of 30.5 parts benzylchloride, 32 parts sodium carbonate and 160 parts toluene, is added dropwise a solution of 43.5 parts 4-(2-oxo-1-benzimidazolyl)-piperidine in 40 parts toluene while stirring. After the addition is complete, the whole is stirred and refluxed for 40 hours. After cooling, the reaction mixture is filtered and the filtrate is evaporated. The residue is dissolved in a mixture of 60 parts ether and 60 parts diisopropylether. After cooling to 0° C., 1-benzyl-4-(2-oxo-1-benzimidazolinyl)-piperidine is obtained; M.P. 160.8–162° C.; pale-brown, amorphous powder.

Example II

A mixture of 3.2 parts 4-fluoro-benzylchloride, 4.4 parts 4-(2-oxo-1-benzimidazolinyl)-piperidine, 3.2 parts sodium carbonate and a few crystals of potassium iodide in 200 parts 4-methyl-2-pentanone is stirred and refluxed for 60 hours. After cooling the reaction mixture, the formed precipitate is filtered off and the filtrate is set aside. The precipitate is extracted first with water and then with chloroform (100 parts and 300 parts respectively). The chloroform layer is dried over magnesium sulfate and evaporated. The solid residue is triturated in 8 parts acetone, filtered off again and dried, yielding 1-(4-fluorobenzyl)-4-(2-oxo-1-benzimidazolinyl)-piperidine; M.P. 181–183° C.; pale-beige, amorphous powder. The filtrate which was set aside (see above) is dried over potassium carbonate and evaporated. The oily residue is evaporated once more in the cold with acetone. The solid residue is triturated in acetone, filtered off again and dried, yielding crude 1-(4-fluoro-benzyl)-4-(2-oxo-1-benzimidazolinyl)-piperidine; M.P. 175.8–178° C.

Example III

A mixture of 50 parts 1-benzyl-4-(2-oxo-1-benzimidazolinyl)-piperidine, 93 parts formaldehyde 35%, and 400 parts 2-propanol, is stirred and refluxed for 8 hours. The reaction mixture is filtered hot and the filtrate is evaporated. The residue is dissolved in 160 parts diisopropylether. After cooling to −20° C., an oil is obtained, which is triturated twice in 240 parts diisopropylether. The undissolved oil is decanted and set aside. The residual solution is dried over potassium carbonate, filtered and gaseous hydrogen chloride is introduced into the filtrate. The precipitated solid hydrochloride is filtered off and dried, yielding crude 1-benzyl-4 - (3-hydroxy-methyl - 2-oxo-1-benzimidazolinyl)-piperidine hydrochloride. The undissolved oil (see above) is diluted with acetone and diisopropylether until a turbid solution is obtained. Then it is dried over potassium carbonate, filtered and gaseous hydrogen chloride is introduced into the filtrate. The precipitated hydrochloride is filtered off and dried, yielding 1-benzyl-4 - (3-hydroxy-methyl-2 - oxo-1-benzimidazolinyl)-piperidine hydrochloride; M.P. 220–271° C. (dec.).

Example IV

A mixture of 61 parts 1-benzyl-4-(2-oxo-1-benzimidazolinyl)-piperidine, 102 parts acetic acid anhydride, and 480 parts anhydrous benzene, is stirred and refluxed for 5 hours. After cooling, the reaction mixture is evaporated. The residue is poured into a mixture of water and ice. The whole is rendered alkaline with ammonium hydroxide solution, whereupon a precipitate is formed. The mixture is extracted with chloroform. The extract is washed with water, dried over sodium sulfate, filtered and evaporated. The residue is crystallized from diisopropylether. After cooling to −20° C., crude 1-benzyl-4-(3-acetyl-2-oxo-1-benzimidazolinyl)-piperidine is obtained. A sample of 5 parts of this crop is purified by recrystallization from 160 parts acetone. The formed solid is filtered off and dried for 10 hours at 70° C. in vacuo, yielding 1-benzyl-4-(3-acetyl-2-oxo-1-benzimidazolinyl)-piperidine; M.P. 124.5–125.5° C.

*Example V*

A mixture of 6.1 parts 1-benzyl-4-(2-oxo-1-benzimidazolinyl)-piperidine, 10 parts propionic acid anhydride, and 120 parts toluene, is stirred and refluxed for 15 hours. After cooling, the reaction mixture is rendered alkaline with sodium hydroxide solution 40%. The aqueous layer is separated and extracted with chloroform. The combined organic layers are dried over potassium carbonate, filtered over activated charcoal and the filtrate is evaporated. The oily residue is treated with diisopropylether, whereupon a solid precipitate is formed. It is filtered off, washed with diisopropylether and dried in vacuo at 80° C., yielding 1-benzyl-4 - (2-oxo-3-propionoyl - 1-benzimidazolinyl)-piperidine; M.P. 135.5–136° C.

*Example VI*

A mixture of 61 parts 1-benzyl-4-(2-oxo-1-benzimidazolinyl)-piperidine, 13.3 parts sodamide in 800 parts toluene is stirred and refluxed for 4 hours. Then there are added 43.3 parts N,N,N-trimethyl-anilinium bromide, and after this addition is complete, the whole is further stirred and refluxed for another 40 hours. After cooling, the reaction mixture is decomposed with water. The organic layer is extracted with hydrochloric acid 50%. This solution is boiled with activated charcoal, filtered and the filtrate is rendered alkaline with sodium hydroxide solution and then extracted with chloroform. The organic layer is dried over sodium sulfate, filtered and evaporated. The residue is dissolved in diisopropylether, filtered and gaseous hydrogen chloride is introduced into the filtrate. The precipitated solid hydrochloride is filtered off and recrystallized from a boiling mixture of 400 parts acetone, 240 parts 2-propanol and 160 parts methanol. After cooling to −20° C., the precipitate is filtered off, washed with acetone and dried at 80° C., yielding 1-benzyl-4-(3-methyl-2-oxo-1-benzimidazolinyl) - piperidine hydrochloride; M.P. 280–284.5° C.

*Example VII*

26.2 parts 1-benzyl-4-(3-hydroxy-methyl-2-oxo-1-benzimidazolinyl)-piperidine hydrochloride are dissolved in 111.5 parts thionyl chloride at a temperature below 16° C. (ice-bath). The solution is first stirred for 2 hours at room temperature and then for 6 hours at 0° C. The reaction mixture is poured into diisopropylether and the whole is stirred overnight at room temperature. The formed precipitate is filtered off, triturated in acetone, filtered off again, washed with acetone and dried in vacuo at 70° C., yielding 1-benzyl-4-[3-(chloro-methyl)-2-oxo-1-benzimidazolinyl]-piperidine hydrochloride; M.P. 233–303° C.

*Example VIII*

A mixture of 15 parts 1-benzyl-4-[3-(chloro-methyl)-2-oxo-1-benzimidazolinyl]-piperidine hydrochloride in 280 parts methanol is heated to reflux temperature. Then there is added a sodium methoxide solution, prepared from 7.5 parts sodium in 120 parts methanol at a temperature of 40° C. After the addition is complete, the whole is further stirred and refluxed for another 3 hours. The reaction mixture is evaporated. The residue is dissolved in 800 parts ether. The solution is washed with water, dried over potassium carbonate, filtered and gaseous hydrogen chloride is introduced into the filtrate. The precipitated solid hydrochloride is filtered off and dried, yielding 1-benzyl-4 - [3-(methoxy-methyl) - 2-oxo-1-benzimidazolinyl]-1-piperidine hydrochloride; M.P. 233.5–235.5° C.

*Example IX*

To a stirred mixture of 4.4 parts 4-(2-oxo-1-benzimidazolinyl)-piperidine, 3.2 parts sodium carbonate, a few crystals of potassium iodide in 200 parts 4-methyl-2-pentanone are added portionwise 4.1 parts 1-bromo-1-phenyl-ethane. The whole is stirred and refluxed for 65 hours. After cooling 70 parts water are added. The formed precipitate is filtered off, washed successively with water and 4-methyl-2-pentanone and dried, yielding dl-1-(1-phenyl-ethyl)-4-(2-oxo-1-benzimidazolinyl) - piperidine; M.P. 234.5–239° C.

*Example X*

To a solution of 153 parts 4-fluoro-propiophenone in 280 parts 2-propanol are added portionwise 26.5 parts sodium tetrahydridoborate, at a temperature of about 35° C. After the addition is complete, the whole is stirred for 3 hours at the same temperature. The reaction mixture is evaporated. The residue is decomposed with 600 parts water. The obtained mixture is diluted with hydrochloric acid until the inorganic salts are dissolved. The whole is extracted three times with ether. The organic layer is washed twice with water, dried and evaporated. The residue is distilled in vacuo, yielding dl-1-(4-fluoro-phenyl)-propanol; B.P. 105–107° C. at 15 mm. pressure.

133 parts dl-1-(4-fluoro-phenyl)-propanol are saturated with gaseous hydrobromic acid at a temperature of 0° C. To the obtained solution are added 80 parts ether and 100 parts water. The aqueous layer is separated and extracted once more with ether. The combined etheric extracts are washed successively with water, sodium hydrogen carbonate solution and water; then dried over calcium sulfate, filtered and evaporated. The oily residue is distilled in vacuo, yielding dl-1-bromo-1-(4-fluoro-phenyl)-propane; boiling at about 84–86° C. at 1 mm. pressure.

To a mixture of 4.4 parts 4-(2-oxo-1-benzimidazolinyl) piperidine, 3.2 parts sodium carbonate, a few crystals of potassium iodide in 200 parts 4-methyl-2-pentanone, are added portionwise 4.8 parts dl-1-bromo-1-(4-fluoro-phenyl)-propane. After the addition is complete, the whole is stirred and refluxed for 65 hours. After cooling, the reaction mixture is decomposed with 100 parts water. The organic layer is separated, washed with water, dried, filtered and evaporated. The oily residue is treated with a mixture of 160 parts acetone and 56 parts 2-propanol. The whole is filtered and the filtrate is heated to reflux temperature. To this hot solution is added a solution of 2.6 parts oxalic acid dihydrate in acetone. After cooling to 0° C., the formed precipitate is filtered off and dried, yielding crude dl-1-[1-(4-fluoro-phenyl)-propyl] - 4 - (2-oxo-1-benzimidazolinyl)-piperidine oxalate, which yields, after recrystallization from a mixture of 24 parts 2-propanol and 24 parts methanol, pure dl-1-[1-(4-fluoro - phenyl)-propyl]-4-(2-oxo-1-benzimidazolinyl)-piperidine oxalate; M.P. 228–230° C. (dec.).

*Example XI*

50 parts 1-(4-fluoro-phenyl)-ethanol are cooled to 0° C. While maintaining this temperature, it is saturated with gaseous hydrobromic acid. Then it is taken up in ether and water. The etheric layer is separated, dried, filtered and the filtrate is distilled in vacuo, yielding dl-1-bromo-1-(4-fluoro-phenyl)-ethane; B.P. 86–87° C. at 9 mm. pressure.

A mixture of 4.1 parts dl-1-bromo-1-(4-fluoro-phenyl)-ethane, 8.8 parts 4-(2-oxo-1-benzimidazolinyl) piperidine and 120 parts anhydrous toluene, is heated in a sealed tube for 3 days at 140° C. After cooling, the formed precipitate is filtered off (mainly 4-(2-oxo-1-benzimidazolinyl)-piperidine hydrobromide). The filtrate is evaporated. The solid residue is triturated in diisopropyl-ether and then filtered off again and dried, yielding dl-1-[1-(4-fluoro-phenyl)-ethyl]-4-(2-oxo - 1 - benzimidazolinyl)-piperidine; M.P. 186–190° C.

*Example XII*

To a stirred mixture of 4.4 parts 4-(2-oxo-1-benzimidazolinyl)-piperidine, 3.2 parts sodium carbonate, a few crystals of potassium iodide in 160 parts 4-methyl-2-pentanone is added dropwise a solution of 4.4 parts dl-1-bromo-1-phenyl-propane in 40 parts 4-methyl-2-pentanone. After the addition is complete, the whole is stirred and refluxed for 65 hours. After cooling, the reaction mixture is decomposed with 50 parts water. The undissolved part is filtered off (filtrate is set aside), yielding a first pure fraction of dl-1-(1-phenyl-propyl)-4-(2-oxo-1-benzimidazolinyl)-piperidine; M.P. 205.5–206° C. From the filtrate, which was set aside, the organic layer is separated, dried over potassium carbonate, filtered and evaporated. The solid residue is triturated in acetone, filtered off again and dried, yielding a second less pure fraction of dl-1-(1-phenyl-propyl)-4-(2-oxo-1-benzimidazolinyl)-piperidine; M.P. 202.5–204° C.

*Example XIII*

152 parts 1-(4-chloro-phenyl)-propanol are cooled to 0° C. Then there are added portionwise 150 parts phosphorous tribromide. After the addition is complete, the temperature is slowly brought to room temperature, whereupon the whole is stirred for 2 hours at 100° C. The reaction mixture is then poured onto 500 parts crushed ice. The mixture is extracted with ether. The extract is washed successively with water, sodium hydrogen carbonate solution and again with water, then dried over calcium chloride, filtered and evaporated. The oily residue is distilled in vacuo, yielding dl-1-bromo-1-(4-chloro-phenyl)-propane; B.P. 140–142° C.; $n_D^{20}$: 1.5650; $d_{20}^{20}$: 1.3782.

A mixture of 5.2 parts dl-1-bromo-1-(4-chloro-phenyl) propane, 4.4 parts 4-(2-oxo-1-benzimidazolinyl)-piperidine, 6.3 parts sodium carbonate, a few crystals of potassium iodide in 200 parts 4-methyl-2-pentanone, is stirred and refluxed for 48 hours. After cooling the reaction mixture, 100 parts water are added. The organic layer is separated, dried over magnesium sulfate, and evaporated. The solid residue is recrystallized from 160 parts boiling acetone. The solid is filtered while hot and dried in vacuo, yielding crude dl-1-[1-(4-chloro-phenyl) propyl]-4-(2-oxo-1-benzimidazolinyl) - piperidine. After cooling the mother liquor to room temperature, a second fraction of crude dl-1-[1-(4-chloro-phenyl)-propyl]-4-(2-oxo-1-benzimidazolinyl)-piperidine is filtered off. These combined crops are recrystallized from 56 parts boiling acetone. The solid is filtered off while hot and dried in vacuo, yielding dl-1-[1-(4-chloro-phenyl)-propyl]-4-(2-oxo-1-benzimidazolinyl)-piperdine; M.P. 197–199° C.

*Example XIV*

A mixture of 4.7 parts dl-1-bromo-1-(4-chloro-phenyl)-ethane, 4.4 parts 4-(2-oxo-1-benzimidazolinyl)-piperidine, 6.3 parts sodium carbonate, a few crystals of potassium iodide in 200 parts 4-methyl-2-pentanone, is stirred and refluxed for 48 hours. After cooling the reaction mixture, 100 parts water are added. The organic layer is separated, dried over magnesium sulfate and evaporated. The solid residue is recrystallized from boiling 160 parts acetone. The solid is filtered while hot and dried in vacuo, yielding less pure dl-1-[1-(4-chloro-phenyl)-ethyl]-4-(2-oxo-1-benzimidazolinyl)-piperidine. This crop is recrystallized once more from 80 parts boiling acetone. After cooling to room temperature, dl-1-[1-(4-chloro-phenyl)-ethyl] - 4-(2-oxo-1-benzimidazolinyl)-piperidine, is obtained; M.P. 200–202° C. From the mother liquor a second pure fraction crystallizes, yielding dl-1-[1-(4-chloro-phenyl)-ethyl]-4-(2-oxo-1-benzimidazolinyl) - piperidine; M.P. 198–199° C.

*Example XV*

A mixture of 5.7 parts dl-1-bromo-1-(4-methyl-phenyl)-propane, 5.1 parts 4-(2-oxo-1-benzimidazolinyl)-piperidine hydrochloride, 5.3 parts sodium carbonate, a few crystals of potassium iodide in 200 parts 4-methyl-2-pentanone, is stirred and refluxed for 70 hours. After cooling the reaction mixture, there are added 70 parts water. The remaining precipitate is filtered off and recrystallized from 120 parts 4-methyl-2-pentanone, yielding dl-1-[1-(4-methyl-phenyl)-propyl]-4-(2-oxo-1-benzimidazolinyl)-piperidine; M.P. 228–230.5° C.

*Example XVI*

A mixture of 5 parts dl-1-bromo-1-(4-methyl-phenyl)-ethane, 5.1 parts 4-(2-oxo-1-benzimidazolinyl)- piperidine hydrochloride, 5.3 parts sodium carbonate, a few crystals of potassium iodide in 200 parts 4-methyl-2-pentanone, is stirred and refluxed for 70 hours. After cooling the reaction mixture, there are added 70 parts water. The organic layer is separated, dried over potassium carbonate, filtered and evaporated. The oily residue is dissolved in 120 parts boiling acetone. This hot solution is filtered and to the warm filtrate are added 24 parts 2-propanol. To this solution is added a solution of 2.6 parts oxalic acid dihydrate in 40 parts acetone. After cooling to room temperature, the precipitated oxalate is filtered off, boiled in 80 parts acetone, filtered off again and dried, to yield dl-1-[1-(4-methyl-phenyl)-ethyl]-4-(2-oxo-1-benzimidazolinyl)-piperidine oxalate; M.P. 237° C. (dec.).

*Example XVII*

A mixture of 3.6 parts dl-1-[1-(4-chloro-phenyl)-ethyl]-4-(2-oxo-1-benzimidazolinyl)-piperidine, 6.5 parts propionic acid anhydride in 80 parts anhydrous benzene, is stirred and refluxed for 15 hours. After cooling, the reaction mixture is washed twice with water, twice with ammonium hydroxide solution and once with water. The organic layer is separated, dried over potassium carbonate, filtered and evaporated. The oily residue is dissolved in 160 parts anhydrous ether and gaseous hydrogen chloride is introduced into this solution. The precipitated solid salt is filtered off and dried, yielding dl-1-[1-(4-chloro-phenyl)-ethyl]-4-(2-oxo-3-propionyl-1 - benzimidazolinyl)- piperidine hydrochloride; M.P. 239–242.5° C.

*Example XVIII*

A mixture of 3.6 parts dl-1-[1-(4-chloro-phenyl)-ethyl]-4-(2-oxo-1-benzimidazolinyl)-piperidine, 0.75 part sodamide in 120 parts dry toluene is stirred and refluxed for 7 hours. After cooling there are added portionwise 4.3 parts N,N,N-trimethylaniliniumbromide and after the addition is complete, the whole is further stirred and refluxed for another 40 hours. After cooling there are added 100 parts water, while stirring. The organic layer is separated, dried over potassium carbonate, filtered and evaporated. The oily residue is dissolved in 200 parts anhydrous ether. This solution is filtered and gaseous hydrogen chloride is introduced into the filtrate. The precipitated solid salt is filtered off and recrystallized from 60 parts boiling acetone. After cooling to room temperature, the solid is filtered off and dried, yielding dl-1-[1-(4-chloro-phenyl)-ethyl]-4-(3-methyl-2-oxo-1 - benzimidazolinyl)-piperidine hydrochloride; M.P. 232.5–235° C.

*Example XIX*

A mixture of 10.7 parts of dl-1-[1-(4-chloro-phenyl)-ethyl]-4-(2-oxo-1-benzimidazolinyl)-piperidine, 40 parts formaldehyde 35% and 210 parts 2-propanol, is stirred and refluxed for 21 hours. The reaction mixture is filtered hot and after cooling the filtrate to room temperature, it is evaporated. The oily residue is dissolved in 280 parts anhydrous ether. This solution is filtered and gaseous hydrogen chloride is introduced into the filtrate. The precipitated solid salt is filtered off, recrystallized from a mixture of 40 parts acetone and 40 parts 2-propanol. After drying for 5 hours at 100° C. in vacuo, dl-1-[1-(4-chloro-phenyl)-ethyl]-4-[3-(hydroxy-methyl)-2-oxo-1-benzimidazolinyl]-piperidine hydrochloride hydrate is obtained; M.P. 235–240° C. (dec.).

*Example XX*

45 parts thionylchloride are cooled to 0° C. While maintaining this temperature, there are added portionwise 9 parts dl-1-[1-(4-chloro-phenyl)-ethyl]-4-[3-(hydroxy-methyl)-2-oxo-1-benzimidazolinyl]-piperidine hydrochloride. After the addition is complete, the whole is stirred for 2 hours at room temperature, followed by stirring for 5 hours at 0° C. Then there are added 40 parts diisopropylether and the whole is stirred overnight at room temperature. The solvent is decanted from the formed oil (which is set aside) and the solvent is further diluted with 560 parts diiospropylether, whereupon a solid precipitate is formed. It is filtered off and recrystallized from 40 parts acetone, to yield a first fraction of dl-1-[1-(4-chloro-phenyl)-ethyl]-4-[3-(chloro-methyl)-2-oxo-1-benzimidazolinyl]-piperidine hydrochloride; M.P. 256° C. (dec.). The oil (which was set aside) is dissolved in 160 parts acetone. After keeping for 5 minutes at room temperature, a solid is precipitated. It is filtered off and dried, yielding a second fraction of dl-1-[1-(4-chloro-phenyl)-ethyl]-4-[3-(chloro-methyl)-2-oxo-1-benzimidazolinyl]-piperidine hydrochloride; M.P. 237–296° C. (dec.).

*Example XXI*

A sodiummethoxide solution, prepared from 2.1 parts sodium in 40 parts methanol, is added dropwise to a solution of 5.5 parts dl-1-[1-(4-chloro-phenyl)-ethyl]-4-[3-(chloro-methyl)-2-oxo-1-benzimidazolinyl]-piperidine hydrochloride in 60 parts methanol. After the addition is complete, the whole is stirred and refluxed for 6 hours. After cooling, the reaction mixture is evaporated. The solid residue is divided between water and chloroform. The organic layer is separated, dried over sodium sulfate, filtered and evaporated. The oily residue solidifies on boiling in diisopropylether. After cooling, the solid is filtered off and dried, yielding dl-1-[1-(4-chloro-phenyl)-ethyl]-4-[3-(methoxy-methyl)-2-oxo-1-benzimidazolinyl]-piperidine; M.P. 107.5–110° C.

*Example XXII*

144.3 parts dl-1-(4-chloro-phenyl)-n-butanol are cooled to 0° C. Then there is introduced gaseous hydrobromic acid until saturation (duration-time; about 3 hours, slightly exothermic reaction: temperature rise to 15° C.). The reaction mixture is washed with water. The aqueous layer is separated and extracted with ether. The combined organic layers are washed with sodium hydrogen carbonate solution and with water, then dried over sodium sulfate and evaporated. The oily residue is distilled in vacuo, yielding two fractions: respectively less pure dl-1-bromo-1-(4-chloro-phenyl)-butane; B.P. 96–98° C. at 1.5 mm. pressure and a second fraction of dl-1-bromo-1-(4-chloro-phenyl)-butane; B.P. 98–110° C. at 1.5 mm. pressure; $n_D^{20}$: 1.5561; $d_{20}^{20}$: 1.348.

A mixture of 5.4 parts dl-1-bromo-1-(4-chloro-phenyl)-butane, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for 70 hours. After cooling, there are added 70 parts water. The organic layer is separated, dried over potassium carbonate, filtered and evaporated. The solid residue is recrystallized twice: first from 80 parts acetone and then from 24 parts 4-methyl-2-pentanone, to yield dl-1-[1-(4-chloro-phenyl)-butyl]-4-(2-oxo-1 - benzimidazolinyl)-piperdine; M.P. 207–211° C.

*Example XXIII*

To a heated mixture of 3.6 parts dl-1-[1-(4-chloro-phenyl)-ethyl]-4-(2-oxo-1 - benzimidazolinyl)-piperidine, 0.6 part trimethylbenzylammoniumhydroxide and 80 parts dry tetrahydrofurane (50° C.) are added portionwise 8 parts ethyl acrylate. After the addition is complete, the whole is further stirred for 7 hours at a temperature of about 50–55° C. After cooling, the reaction mixture is filtered and the filtrate is evaporated. The oily residue is dissolved in 200 parts ether. The etheric solution is dried over potassium carbonate, filtered and then gaseous hydrogen chloride is introduced into the filtrate. The precipitated solid salt is filtered off and dissolved in 40 parts acetone. After cooling to room temperature, the solid is filtered off and dried, yielding dl-1-[1-(4-chloro-phenyl)-ethyl]-4-{3 - [2 - (ethoxy-carbonyl)-ethyl]-2-oxo-1 - benzimidazolinyl}-piperidine hydrochloride; M.P. 224–226° C.

*Example XXIV*

To a heated mixture (±40° C.) of 3.6 parts dl-1-[1-(4-chloro-phenyl)-ethyl]-4-(2 - oxo-benzimidazolinyl)-piperidine, 0.5 part trimethylbenzylammoniumhydroxide, and 32 parts dry tetrahydrofurane is added dropwise a solution of 2.6 parts acrylonitrile in 8 parts dry tetrahydrofurane. After the addition is complete, the whole is further stirred for 4 hours at a temperature of about 40–45° C. The reaction mixture is filtered hot and the filtrate is evaporated. The residue is dissolved in 52 parts 2-propanol and this solution is filtered. After keeping the filtrate for 3 hours at room temperature, the solvent is decanted from a dark-coloured oil. After further keeping this filtrate overnight at room temperature, the formed solid is filtered off, yielding crude free base. This crop is dissolved in a mixture of 40 parts acetone and 40 parts anhydrous ether. The solution is filtered and gaseous hydrogen chloride is introduced into the filtarte. The solvent is decanted from an oil and after keeping overnight at room temperature, the formed solid is filtered off and dried, yielding dl-1-[1-(4-chloro-phenyl)-ethyl]-4-[3-(2-cyano - ethyl)-2-oxo-1-benzimidazolinyl]-piperidine hydrochloride; M.P. 211.5–216.5° C.

*Example XXV*

To a stired and refluxing mixture of 6 parts 4-(2-oxo-1-benzimidazolinyl)-piperidine hydrochloride, 9.3 parts sodium carbonate, a few crystals of potassium iodide and 136 parts 4-methyl-2-pentanone, is added dropwise a solution of 6 parts dl-1-bromo-1-phenyl-butane in 24 parts of the same solvent. After the addition is complete, stirring and refluxing is continued for 48 hours. After cooling, there are added 150 parts water. The organic layer is separated, dried over potassium carbonate, filtered and evaporated. The solid residue is recrystallized from 50 parts 4-methyl-2-pentanone to yield dl-1-(1-phenyl-butyl)-4-(2 - oxo-1-benzimidazolinyl)-piperidine; M.P. 196–197° C.

*Example XXVI*

A mixture of 2.4 parts 1-chloro-2-phenylethane, 4 parts 4-(2-oxo-1-benzimidazolinyl)-piperidine, 6 parts sodium carbonate, a few crystals of potassium iodide in 176 parts 4-methyl-2-pentanone is stired and refluxed for 48 hours. After cooling, 200 parts water are added. The remaining precipitate is filtered off. From the filtrate, the organic layer is separated, dried over $MgSO_4$, filtered and filtrate is concentrated to about 50 parts. To the residue are added 24 parts toluene. The whole is kept at room temperature, to yield 1-(2-phenylethyl)-4-(2-oxo-1-benzimidazolinyl)-piperidine; M.P. 182–183.5° C.; white granular powder.

Example XXVII

To a stirred mixture of 5 parts 4-(2-oxo-1-benzimidazolinyl)-piperidine, 7.3 parts sodium carbonate, a few crystals of potassium iodide in 136 parts 4-methyl-2-pentanone, is added dropwise a solution of 5.6 parts 1-bromo-3-phenylpropane in 24 parts 4-methyl-2-pentanone. After the addition is complete, the whole is stirred and refluxed for 60 hours. After cooling, the reaction mixture is filtered until clear. The filtrate is evaporated. The oily residue is triturated in diethylether. The precipitated solid is filtered off, yielding product. This crop is dissolved in toluene. This solution is evaporated together with the diethylether. The oily residue is dissolved in 100 parts diluted hydrochloric acid. The obtained solution is washed with toluene, alkalized with $NH_4OH$ and extracted with toluene. The organic layer is dried over $MgSO_4$, boiled with activated charcoal and evaporated. On treating the oily residue with 32 parts ether, 1-(3-phenyl-propyl)-4-(2-oxo-1-benzimidazolinyl)-piperidine is obtained; M.P. 118–119° C.; white amorphous powder.

Example XXVIII

To a stirred mixture of 4.3 parts 4-(2-oxo-1-benzimidazolinyl)-piperidine, 3.2 parts sodium carbonate, a few crystals of potassium iodide in 160 parts 4-methyl-2-pentanone, is added dropwise a solution of 4.2 parts 1-chloro-4-phenyl-butane in 40 parts 4-methyl-2-pentanone. After the addition is complete, the whole is stirred and refluxed for 48 hours. After cooling the reaction mixture, 50 parts water are added. The organic layer is separated, dried over $K_2CO_3$, filtered and evaporated. The solid residue is triturated in 40 parts acetone and filtered off, to yield 1-(4-phenyl-butyl)-4-(2-oxo-1-benzimidazolinyl)-piperidine; M.P. 149–149.6° C.; pale-beige, amorphous powder. After keeping the filtrate overnight at room temperature, a second fraction of 1-(4-phenyl-butyl)-4-(2-oxo-1-benzimidazolinyl)-piperidine is filtered off; M.P. 146–147.5° C.

Example XXIX

A mixture of 6.1 parts 1-chloro-2-(4-chloro-phenyl)-ethane, 6.5 parts 4-(2-oxo-1-benzimidazolinyl)-piperidine, 4.8 parts sodium carbonate, a few crystals of potassium iodide in 200 parts 4-methyl-2-pentanone is stirred and refluxed for 72 hours. After cooling, 150 parts water are added. The organic layer is separated, dried, filtered and the filtrate is evaporated. The solid residue is washed with 80 parts diisopropylether, filtered off and dried, yielding 1-[2-(4-chloro-phenyl)-ethyl]-4-(2-oxo-1-benzimidazolinyl)-piperidine; M.P. 182–184° C.; white granular powder.

Example XXX

A mixture of 5.4 parts 1-chloro-2-(4-methyl-phenyl)-ethane, 6.5 parts 4-(2-oxo-1-benzimidazolinyl)-piperidine, 4.8 parts sodium carbonate, a few crystals of potassium iodide in 200 parts 4-methyl-2-pentanone, is stirred and refluxed for 72 hours. After cooling, 150 parts water are added. The organic layer is separated, dried, filtered and evaporated. The solid residue is stirred in 80 parts diisopropylether, filtered off and dried, yielding 1-[2-(4-methyl-phenyl)-ethyl]-4-(2-oxo-1-benzimidazolinyl)-piperidine; M.P. 198–199° C.; white flaky powder.

Example XXXI

A mixture of 6 parts 1-chloro-2-(4-methoxy-phenyl)-ethane, 6.5 parts 4-(2-oxo-1-benzimidazolinyl)-piperidine, 4.8 parts sodium carbonate, a few crystals of potassium iodide in 200 parts 4-methyl-2-pentanone, is stirred and refluxed for 72 hours. After cooling, 150 parts water are added. The organic layer is separated, dried, filtered and evaporated. The solid residue is stirred in 80 parts diisopropylether, filtered off and dried, yielding 1-[2-(4-methoxy-phenyl)-ethyl]-4-(2-oxo-1-benzimidazolinyl)-piperidine; M.P. 184–187° C.; pale-yellow, granular powder.

Example XXXII

A mixture of 3.6 parts 1-chloro-2-(4-fluoro-phenyl)-ethane, 4.4 parts 4-(2-oxo-1-benzimidazolinyl)-piperidine, 3.2 parts sodium carbonate, a few crystals of potassium iodide in 200 parts 4-methyl-2-pentanone, is stirred and refluxed for 60 hours. After cooling, the reaction mixture is filtered from some insoluble matter. The filtrate is dried over potassium carbonate and evaporated. The solid residue is triturated in 16 parts acetone, filtered off again and dried, yielding 1-[2-(4-fluoro-phenyl)-ethyl]-4-(2-oxo-1-benzimidazolinyl)-piperidine; M.P. 186–188.5° C.; beige, amorphous powder.

Example XXXIII

A mixture of 5 parts 1-bromo-5-phenyl-pentane, 4.4 parts 4-(2-oxo-1-benzimidazolinyl)-piperidine, 3.2 parts sodium carbonate, a few crystals of potassium iodide in 200 parts 4-methyl-2-pentanone, is stirred and refluxed for 60 hours. After cooling, 50 parts water are added. The organic layer is separated, dried over potassium carbonate and evaporated. The oily residue is dissolved in 24 parts acetone. To this hot solution is added a solution of 2.5 parts oxalic acid dihydrate in 24 parts acetone. An oily oxalate is obtained, which solidifies on scratching. It is filtered off and recrystallized from 56 parts boiling acetone. After cooling to room temperature, 1-(5-phenyl-pentyl)-4-(2-oxo-1-benzimidazolinyl)-piperidine-oxalate is obtained; M.P. 115–160° C. (dec.); white amorphous powder.

Example XXXIV

To a stirred and refluxing mixture of 4.4 parts 4-(2-oxo-1-benzimidazolinyl)-piperidine, 3.2 parts sodium carbonate, a few crystals of potassium iodide in 160 parts 4-methyl-2-pentanone, is added dropwise a solution of 4.1 parts 1-chloro-4-(4-fluoro-phenyl)-butane in 40 parts 4-methyl-2-pentanone. After the addition is complete, the whole is stirred and refluxed for 65 hours. After cooling, the reaction mixture is decomposed with 50 parts water. The organic layer is separated, dried over potassium carbonate, filtered and evaporated. The solid residue is dissolved in a mixture of 160 parts acetone and 80 parts diisopropylether. The whole is filtered and gaseous hydrogen chloride is introduced into the filtrate; a sticky hydrochloride is precipitated which solidifies on standing at room temperature. It is filtered off and recrystallized from 40 parts boiling acetone. After cooling to room temperature, 1-[4-(4-fluoro-phenyl)-butyl]-4-(2-oxo-1-benzimidazolinyl)-piperidine hydrochloride is obtained; M.P. 211.5–212° C.

Example XXXV

A mixture of 4.4 parts 1-bromo-2-phenyl-propane, 4.4 parts 4-(2-oxo-1-benzimidazolinyl)-piperidine, 3.2 parts sodium carbonate, a few crystals of potassium iodide in 200 parts 4-methyl-2-pentanone is stirred and refluxed for 60 hours. After cooling, 50 parts water are added. The organic layer is separated, dried over potassium carbonate and evaporated. The oily residue is dissolved in a mixture of 120 parts ether and 75 parts chloroform. The combined organic layers are dried over potassium carbonate and evaporated. The oily residue solidifies on evaporation in diisopropylether, yielding crude 1-(2-phenyl-propyl)-4-(2-oxo-1-benzimidazolinyl)-piperidine.

This crop is dissolved in a mixture of 150 parts ether, 100 parts water and ammonium hydroxide and the whole is shaken vigorously. The etheric layer is dried over potassium carbonate and evaporated. The solid residue is triturated in 8 parts acetone, filtered off again and dried, yielding dl-1-(2-phenyl-propyl)-4-(2-oxo-1-benzimidazolinyl)-piperidine; M.P. 188–192° C.; beige scales.

Example XXXVI

To a stirred and refluxing mixture of 4.4 parts 4-(2-oxo-1-benzimidazolinyl)-piperidine, 3.2 parts sodium carbonate, a few crystals of potassium iodide in 160 parts 4-methyl-2-pentanone, is added dropwise a solution of 5.2 parts 1-bromo-3-phenyl-butane in 40 parts 4-methyl-2-pentanone. After the addition is complete, the whole is stirred and refluxed for 65 hours. After cooling, 50 parts water are added. The organic layer is separated, dried over potassium carbonate, filtered and evaporated. The oily residue is dissolved in acetone. This solution is filtered from some unsoluble matter and to the hot filtrate is added a hot solution of 2.5 parts oxalic acid dihydrate in 40 parts acetone: an oily oxalate is formed which solidifies on further heating. It is filtered off, washed with acetone and dried, yielding dl-1-(3-phenyl-butyl)-4-(2-oxo-1-benzimidazolinyl)-piperidine oxalate; M.P. 216–216.5° C.; grey-white, amorphous powder.

Example XXXVII

To a mixture of 4.4 parts 4-(2-oxo-1-benzimidazolinyl)-piperidine, 3.2 parts sodium carbonate, a few crystals of potassium iodide in 200 parts 4-methyl-2-pentanone are added 4.1 parts 1-chloro-4-phenyl-pentane. The whole is stirred and refluxed for 65 hours. After cooling, 70 parts water are added. The organic layer is separated, dried over potassium carbonate, filtered and evaporated. The residue is recrystallized from 40 parts acetone to yield crude dl-1-(4-phenyl-pentyl)-4-(2-oxo-1-benzimidazolinyl)-piperidine. This fraction is recrystallized once more from 120 parts toluene. The whole is filtered and after cooling the filtrate to room temperature, dl-1-(4-phenyl-pentyl)-4-(2-oxo-1-benzimidazolinyl) - piperidine is obtained; M.P. 161–163° C.; white amorphous powder.

Example XXXVIII

To a stirred mixture of 300 parts fluoro-benzene, and 56.2 parts concentrated sulfuric acid are added dropwise 121 parts freshly distilled allylbromide, while maintaining a temperature of about 40° C. (exothermic reaction). After the addition is complete, the whole is stirred at the same temperature for 5 hours and kept overnight at room temperature. The organic layer is separated and washed successively with 30 parts concentrated sulfuric acid, 60 parts of a saturated sodium sulfate solution and 50 parts of a 10% sodium hydroxide solution. To the resulting suspension is added benzene. The aqueous layer is drawn off and the organic layer is washed once more with 50 parts water. The layers are separated and the organic layer is dried over sodium sulfate and evaporated. The residue is distilled in vacuo, yielding crude dl-1-bromo-2-(4-fluoro-phenyl)-propane; B.P. 90–105° C. at 1 mm. pressure. On redistillation of this fraction, there is obtained dl-1-bromo-2-(4-fluoro-phenyl)-propane; B.P. 74–77° C. at 0.9 mm. pressure.

To a mixture of 4.4 parts 4-(2-oxo-1-benzimidazolinyl)-piperidine, 3.2 parts sodium carbonate, a few crystals of potassium iodide in 200 parts 4-methyl-2-pentanone are added portionwise 4.8 parts dl-1-bromo-2-(4-fluoro-phenyl)-propane. After the addition is complete, the whole is stirred and refluxed for 65 hours. After cooling the reaction mixture, 50 parts water are added. The organic layer is dried over potassium carbonate, filtered and evaporated. The residue is dissolved in a mixture of 80 parts acetone and 16 parts 2-propanol. This solution is filtered and to the filtrate is added a warm solution of 2.6 parts oxalic acid dihydrate in acetone. After cooling to room temperature, the solid oxalate is filtered off and recrystallized from 80 parts methanol, yielding dl-1-[2 - (4 - fluoro-phenyl)-propyl]-4-(2 - oxo-1-benzimidazolinyl)-piperidine oxalate; M.P. 190–193.5° C. (dec.).

Example XXXIX

To a stirred mixture of 4.4 parts 4-(2-oxo-1-benzimidazolinyl)-piperidine, 3.2 parts sodium carbonate, a few crystals of potassium iodide in 200 parts 4-methyl-2-pentanone are added portionwise 4.7 parts 1-bromo-2-phenyl-butane. After the addition is complete, the whole is stirred and refluxed for 65 hours. After cooling, the reaction mixture is decomposed with 70 parts water. The organic layer is separated, dried over potassium carbonate, filtered and evaporated. The residue is dissolved in 80 parts acetone and the solution is filtered. The filtrate is diluted with 30 parts 2-propanol and the whole is boiled for a few minutes. To this hot solution is added a solution of 2.6 parts oxalic acid dihydrate in 24 parts acetone and the whole is further boiled for 5 minutes. The solvent is decanted from a small precipitate. After cooling the solvent at 0° C., dl-1-(2-phenyl-butyl)-4-(2-oxo-1-benzimidazolinyl)-piperidine oxalate is obtained; M.P. 132–192° C. (dec.).

Example XL 250 parts hydrobromic solution (60%) are saturated with gaseous hydrobromic acid, while maintaining a temperature of 0° C. Then there are added dropwise 90 parts 1-cyclopropyl - 1 - (4-fluoro-phenyl)-ethanol (exothermic reaction). After the addition is complete, the whole is stirred for 1 hour at 0° C. Th cooling-bath is removed. The oily layer is separated and diluted with 200 parts diethyl ether. The obtained mixture is washed with a sodium hydrogen carbonate solution in water, dried over magnesium sulfate, filtered and evaporated. The oily residue is distilled in vacuo, yielding 5-bromo-2-(4-fluoro-phenyl)-2-pentene; B.P. 133–136° C. at 10 mm. pressure; colourless liquid; $n_D^{20}$: 1.5500 and $d_{20}^{20}$: 1.3384.

A mixture of 59 parts 5-bromo-2-(4-fluoro-phenyl)-2-pentene, 30 parts distilled water and 240 parts methanol is hydrogenated at normal pressure and at a temperature of about 30–35° C., in the presence of 7 parts palladium-on-charcoal catalyst 10%. After the calculated amount of hydrogen is taken up, hydrogenation is stopped. The whole is boiled for a few minutes. The catalyst is then filtered off and the filtrate is evaporated. The oily residue is distilled in vacuo, yielding two fractions, respectively dl-1-bromo-4-(4-fluoro-phenyl)-pentane; B.P. 133–139° C. at 16 mm. pressure, and dl-1-bromo-4-(4-fluoro-phenyl)-pentane; B.P. 141–141.5° C. at 16 mm. pressure.

A mixture of 5.4 parts dl-1-bromo-4-(4-fluoro-phenyl)-pentane, 4.4 parts 4-(2-oxo-1-benzimidazolinyl)-piperidine, 3.2 parts sodium carbonate, a few crystals of potassium iodide in 200 parts 4-methyl-2-pentanone is stirred and refluxed for 65 hours. After cooling the reaction mixture is decomposed with 70 parts water. The whole is filtered from some insoluble matter and from the filtrate the organic layer is separated, dried over potassium carbonate, filtered and evaporated. The oily residue is evaporated once more with acetone and the solid residue is recrystallized from a mixture of 4-methyl-2-pentanone and acetone, yielding crude dl-1-[4-(4-fluoro-phenyl)-pentyl]-4-(2-oxo-1-benzimidazolinyl)-piperidine. From the mother liquor a second fraction crystallizes which is recrystallized together with the first fraction of product from a mixture of acetone and 2-propanol, yielding crude dl-1-[4-(4-fluoro-phenyl)-pentyl]-4-(2-oxo - 1 - benzimidazolinyl)-piperidine; M.P. 157.5–160° C. From the filtrate a second fraction crystallizes, yielding dl-1-[4-(4-fluoro-phenyl) - pentyl]-4-(2-oxo - 1 - benzimidazolinyl)-piperidine; M.P. 158–161.5° C.

Example XLI

To a stirred and refluxing mixture of 145 parts 4-fluoro-benzyl-cyanide, 642 parts diethyl carbonate and 48 parts anhydrous toluene are added portionwise 53.5 parts sodium. (Temperature: about 95–100° C.) After the addition is complete, the whole is further stirred and refluxed for 1 hr., 30 min. After cooling overnight the reaction mixture is decomposed by succesive slow addition of 640 parts water and 250 parts hydrochloric acid. The aqueous layer is separated and extracted twice with diisopropylether. The organic layer is separated, dried over sodium sulfate and evaporated. The oily residue is fractionated in vacuo, yielding dl-α-(ethoxy-carbonyl)-4-fluoro-benzyl-cyanide; B.P. 112–123° C. at 1 mm. pressure; $n_D^{20}$: 1.4900; $d_{20}^{20}$: 1.1655.

To 308 parts absolute ethanol are added portionwise 22 parts sodium (exothermic reaction: temperature rises to 75° C.). After cooling to about 50° C., there is added a solution of 188.7 parts dl-α-(ethoxy-carbonyl)-4-fluoro-benzyl-cyanide in 544 parts absolute ethanol. After the addition is complete, the whole is stirred for 1 hr., 30 min. at room temperature. Then there is added a solution of 125.5 parts ethyl bromide in 80 parts absolute ethanol. After the addition is complete, the mixture is stirred and refluxed for 2 hours. After cooling the reaction mixture, the precipitated sodium bromide is filtered off, washed on the filter with ethanol and the filtrate is evaporated. The oily residue is treated with water and diisopropylether while shaken. The aqueous layer is separated and extracted once more with diisopropylether. The combined organic layers are dried over sodium sulfate and evaporated. The oily residue is fractionated in vacuo, yielding dl-α-(ethoxy-carbonyl)-α-ethyl-4-fluoro-benzyl-cyanide; B.P. 107–110° C. at 0.7 mm. pressure; $n_D^{20}$: 1.4841; $d_{20}^{20}$: 1.1154.

To a solution of 82 parts potassium hydroxide (85%) in 720 parts absolute denatured ethanol, are added portionwise 146 parts dl-α-(ethoxy-carbonyl)-α-ethyl-4-fluoro-benzyl-cyanide. After the addition is complete, the whole is stirred and refluxed for 3 minutes. After cooling to room temperature, the formed precipitate is filtered off, washed on the filter with ethanol and the combined filtrates are evaporated. The oily residue is taken up in 400 parts water. The mixture is extracted with diisopropylether (three times). The solvent is dried over sodium carbonate and evaporated. The residue is fractionated in vacuo, yielding dl-2-(4-fluoro-phenyl)-butyronitrile; B.P. 124–125° C. at 15 mm. pressure; $n_D^{20}$: 1.4903; $d_{20}^{20}$: 1.0578.

A solution of 81.6 parts dl-2-(4-fluoro-phenyl)-butyronitrile and 118 parts potassium hydroxide (85%) and 472 parts ethanol (90%), is stirred and refluxed until no more ammonia gas is evolved. The mixture is then neutralized with 200 parts hydrochloric acid 2 N, and the whole is further stirred and refluxed overnight. The ethanol is evaporated. The residue is dissolved in 600 parts water. The aqueous solution is washed with 160 parts ether; then to the water layer are added crushed ice and the whole is acidified with concentrated hydrochloric acid. The obtained oily layer is extracted three times with 320 parts diisopropylether. The organic layer is dried over sodium sulfate and evaporated. The oily residue is distilled in vacuo, yielding dl-2-(4-fluoro-phenyl)-butyric acid; B.P. 120–123° C. at 1.1 mm. pressure.

To a stirred mixture of 22.5 parts lithium tetrahydridoaluminate in 400 parts anhydrous ether (room temperature) is added dropwise a solution of 83 parts dl-2-(4-fluoro-phenyl)-butyric acid in 320 parts anhydrous ether (exothermic reaction). After the addition is complete, the whole is stirred and refluxed for 2 hours. The reaction mixture is decomposed immediately with water and concentrated hydrochloric acid (ice-bath). The acid aqueous layer is separated and extracted twice with diisopropylether. The organic layer is dried over sodium sulfate and evaporated. The oily residue is fractionated in vacuo, yielding dl-2-(4-fluoro-phenyl)-butanol; B.P. 126–127° C. at 17.5 mm. pressure; $n_D^{20}$: 1.5003; $d_{20}^{20}$: 1.072.

69 parts dl-2-(4-fluoro-phenyl)-butanol are stirred and cooled in an ice-bath. Then there are added 53 parts phosphorous tribromide while keeping a temperature between 10° and 15° C. After the addition is complete, the whole is stirred overnight at room temperature. The whole is then heated for 1 hour in a boiling water-bath. After cooling, the reaction mixture is poured into crushed ice. The whole is extracted with petroleum ether and then washed successively twice with sodium carbonate (5%), once with concentrated sulfuric acid, once with sodium carbonate and once with water. After drying over sodium sulfate, the organic layer is evaporated. The residue is distilled in vacuo, yielding dl-1-bromo-2-(4-fluoro-phenyl)-butane; B.P. 113–117° C. at 12 mm. pressure.

A mixture of 5.1 parts dl-1-bromo-2-(4-fluoro-phenyl)-butane, 4.4 parts 4-(2-oxo-1-benzimidazolinyl)-piperidine, 3.2 parts sodium carbonate, a few crystals of potassium iodide in 200 parts 4-methyl-2-pentanone is stirred and refluxed for 65 hours. After cooling, the reaction mixture is decomposed with 70 parts water. The organic layer is separated, dried over potassium carbonate, filtered and evaporated. The residue is dissolved in 160 parts acetone, the solution is filtered hot and to the filtrate are added 24 parts 2-propanol. The whole is boiled for a few minutes and then there is added a solution of 2.6 parts oxalic acid dihydrate in 40 parts acetone. The solution is decanted from some sticky precipitate. After cooling the solution at room temperature, dl-1-[2-(4-fluoro-phenyl)-butyl]-4-(2-oxo-1-benzimidazolinyl)-piperidine oxalate is obtained; M.P. 203–209.5° C.

*Example XLII*

To a solution of 4-methyl-phenyl-magnesium bromide, prepared from 49 parts magnesium and 341 parts 4-methyl-bromobenzene in 400 parts dry tetrahydrofuran, is added dropwise a solution of 160 parts cyclopropyl methyl ketone in 560 parts anhydrous ether. After the addition is complete, the whole is stirred and refluxed for 1 hr. 30 min. After cooling, the reaction mixture is decomposed by successive addition of 50 parts ammonium chloride and 250 parts water, at a temperature below 20° C. The solution is decanted from some gelatinous precipitate and from the solution the etheric layer is separated and set aside. The gelatinous precipitate is triturated in ether and the solvent is decanted. This treatment is repeated twice. The combined organic layers are dried over potassium carbonate, filtered and evaporated. The residue is distilled in vacuo, yielding a first fraction of dl-cyclopropyl-methyl-4-methylphenyl-carbinol; B.P. 110–115° C. at 0.9–2 mm. pressure and a second fraction of dl-cyclopropyl-methyl-4-methylphenyl-carbinol; B.P. 110–111° C. at 0.6–0.7 mm. pressure.

To a mixture of 248 parts dl-cyclopropyl-methyl-4-methylphenyl-carbinol and 480 parts anhydrous benzene, are added dropwise 215 parts thionyl chloride (exothermic reaction). After the addition is complete, the whole is further stirred and refluxed for 2 hours. The reaction mixture is evaporated. The oily residue is extracted with benzene. This organic layer is dried over sodium sulfate, filtered and evaporated again. The oily residue is distilled in vacuo, yielding a first fraction of 5-chloro-2-(4-methylphenyl)-2-pentene; B.P. 102–110° C. at 0.7 mm. pressure; $n_D^{20}$: 1.5456; $d_{20}^{20}$: 1.0389; and a second fraction of 5-chloro-2-(4-methyl-phenyl)-2-pentene; B.P. 99–103° C. at 0.9 mm. pressure; $n_D^{20}$: 1.5500; $d_{20}^{20}$: 1.0407.

A solution of 146 parts 5-chloro-2-(4-methyl-phenyl)-2-pentene in 320 parts 2-propanol is hydrogenated at normal pressure and at a temperature of about 40° C., in the presence of 10 parts palladium-on-charcoal catalyst (10%). After the calculated amount of hydrogen is taken up, hydrogenation is stopped. The catalyst is filtered off and the filtrate is evaporated. The oily residue is distilled in vacuo, yielding dl-1-chloro-4-(4-methylphenyl)-pentane; B.P. 94–95° C. at 0.2 mm. pressure; $n_D^{20}$: 1.5102; $d_{20}^{20}$: 0.9918.

A mixture of 4.4 parts dl-1-chloro-4-(4-methyl-phenyl)-pentane, 4.4 parts 4-(2-oxo-1-benzimidazolinyl)-piperidine, 3.2 parts sodium carbonate, a few crystals of potassium iodide in 200 parts 4-methyl-2-pentanone, is stirred and refluxed for 65 hours. After cooling, the reaction mixture is decomposed with 70 parts water. The organic layer is separated, dried over potassium carbonate, filtered and evaporated. The oily residue is dissolved in 120 parts acetone. This solution is filtered and to the filtrate are added 24 parts 2-propanol and the whole is boiled for a few minutes. To this hot solution is added a warm solution of 2.6 parts oxalic acid dihydrate in 40 parts acetone. After the addition is complete, the whole is boiled once more for a few minutes, whereupon a solid precipitate is formed. It is filtered off and dried, yielding crude dl-1-[4-(4-methyl-phenyl)-pentyl]-4-(2-oxo - 1 - benzimidazolinyl)-piperidine oxalate. This crop is boiled in a mixture of 120 parts 2-propanol and 120 parts methanol and filtered while hot and dried again, yielding dl-1-[4-(4-methyl-phenyl)-pentyl] - 4-(2-oxo-1-benzimidazolinyl-piperidine oxalate; M.P. 226° C. (dec.).

*Example XLIII*

Starting from 11 parts magnesium, 69.7 parts methyl iodide in 160 parts anhydrous ether, a methyl magnesium iodide solution is prepared in the usual manner. To this solution is added a solution of 77 parts 4-chloro-phenyl cyclopropyl ketone in 240 parts anhydrous ether, while stirring and refluxing. After the addition is complete, a solid is precipitated. The whole is stirred for two hours at room temperature, then decomposed with 800 parts of an ammonium chloride solution 20% and the organic layer is separated, washed with water, dried over sodium sulfate, filtered and the filtrate is evaporated. The oily residue is distilled in vacuo, yielding dl-4-chlorophenyl-cyclopropyl-methyl-carbinol; B.P. 102–104° C. at 1 mm. pressure; $n_D^{20}$: 1.5485; $d_{20}^{20}$: 1.1498.

A mixture of 62 parts dl-4-chlorophenyl-cyclopropyl-methyl-carbinol and 80 parts benzene is cooled with ice-water to a temperature below 15° C. Then there are added dropwise 40 parts thionyl chloride. After the addition is complete, the whole is stirred and refluxed for 1 hour. After cooling, the reaction mixture is evaporated. The residue is taken up in 160 parts benzene and the whole is evaporated again. This treatment is repeated once more to remove excess thionyl chloride. The remaining oily residue is distilled in vacuo, yielding 5-chloro-2-(4-chloro-phenyl)-2-pentene; B.P. 128–131° C. at 1.5 mm. pressure. $n_D^{20}$: 1.5696; $d_{20}^{20}$: 1.1694.

A solution of 42 parts 5-chloro-2-(4-chloro-phenyl)-2-pentene in 120 parts 2-propanol is hydrogenated at normal pressure and at a temperature of about 35–40° C., in the presence of 4 parts palladium-on-charcoal catalyst. After the calculated amount of hydrogen is taken up, hydrogenation is stopped. The catalyst is filtered off and the filtrate is evaporated. The oily residue is dissolved in 80 parts toluene and this solution is evaporated again. The oily residue is distilled in vacuo, yielding dl-1-chloro-4-(4-chloro-phenyl)-pentane; B.P. 115–117° C. at 1.5 mm. pressure: $n_D^{20}$: 1.5291; $d_{20}^{20}$: 1.1244.

To a stirred and refluxing mixture of 5.6 parts 4-(2-oxo-1 - benzimidazolinyl) - piperidine hydrochloride, 9.3 parts sodium carbonate, a few crystals of potassium iodide in 136 parts 4-methyl-2-pentanone, is added dropwise a solution of 5.6 parts dl-1-chloro-4-(4-chlorophenyl)-pentane in 24 parts 4-methyl-2-pentanone. After the addition is complete, the whole is further stirred and refluxed for another 48 hours. After cooling the reaction mixture, 150 parts water are added. The organic layer is separated, dried over potassium carbonate and evaporated. The oily residue is dissolved in a boiling mixture of 80 parts diisopropyl ether and 24 parts acetone and this solution is filtered several times until clear. After cooling the filtrate to room temperature, the solid is filtered off and dried, yielding dl-1-[4-(4-chloro-phenyl)-pentyl]-4-(2-oxo - 1 - benzimidazolinyl)-piperidine; M.P. 124–129° C.

*Example XLIV*

Starting from 20.6 parts magnesium and 120 parts methyliodide, a solution of methyl magnesium iodide is prepared in 160 parts anhydrous ether in the usual manner. To this solution is added a solution of 135 parts magnesium in 120 parts anhydrous ether (exothermic reaction). After the addition is complete, the whole is stirred and refluxed for 3 hours. After cooling, the reaction mixture is poured into ice-water. To the mixture is added an ammonium chloride solution. The organic layer is separated and the aqueous layer is extracted once more with ether. The combined organic layers are dried over sodium sulfate and evaporated. The oily residue is distilled in vacuo, yielding dl-cyclopropyl-4-methoxyphenyl-methyl-carbinol; B.P. 143° C. at 3 mm. pressure; $n_D^{20}$: 1.5432; $d_{20}^{20}$: 1.0720.

To a solution of 57.5 parts dl-cyclopropyl-4-methoxyphenyl-methyl-carbinol in 80 parts benzene, are added dropwise 40 parts thionyl chloride (exothermic reaction). After the addition is complete, the whole is stirred and refluxed for 1 hour. The reaction mixture is evaporated and the oily residue is distilled in vacuo, yielding 5-chloro-2-(4-methoxy-phenyl)-2-pentene; B.P. 141–143° C. at 2 mm. pressure; $n_D^{20}$: 1.5578; $d_{20}^{20}$: 1.1080.

A mixture of 17.5 parts 5-chloro-2-(4-methoxy-phenyl)-2-pentene, and 160 parts 2-propanol is hydrogenated at normal pressure and at a temperature of about 35° C., in the presence of 2 parts palladium-on-charcoal catalyst. After the calculated amount of hydrogen is taken up, hydrogenation is stopped. The catalyst is filtered off and the filtrate is evaporated, yielding dl-1-chloro-4-(4-methoxy-phenyl)-pentane.

A mixture of 3 parts dl-1-chloro-4-(4-methoxy-phenyl)-pentane, 2.6 parts 4-(2-oxo-1-benzimidazolinyl)-piperidine, 2 parts sodium carbonate, a few crystals of potassium iodide in 200 parts 4-methyl-2-pentanone is stirred and refluxed for 65 hours. After cooling the reaction mixture, there are added 50 parts water. The undissolved part is filtered off and discarded. From the filtrate the organic layer is separated, dried over potassium carbonate, filtered and evaporated. The semi-solid residue is dissolved in 32 parts acetone. After cooling overnight at —20° C., the solid is filtered off and recrystallized from a mixture of 16 parts acetone and 16 parts diisopropylether, yielding crude free base of dl-1-[4-(4-methoxyphenyl)-pentyl] - 4 - (2-oxo-1-benzimidazolinyl)-piperidine oxalate. This crop is dissolved in 24 parts warm acetone. To this solution is added a hot solution of 0.4 part oxalic acid dihydrate in 12 parts acetone. After cooling to room temperature, crude dl-1-[4-(4-methoxyphenyl)-pentyl] - 4 - (2-oxo-1-benzimidazolinyl)-piperidine oxalate is filtered off. This fraction is recrystallized from a mixture of 40 parts acetone and 40 parts 2-propanol. The undissolved part is filtered off and dried, yielding dl-1-[4-(4-methoxy-phenyl)-pentyl]-4-(2-oxo-1-benzimidazolinyl)-piperidine oxalate; M.P. 215.5–216.5° C.

*Example XLV*

A mixture of 5.1 parts dl-1-bromo-3-(4-fluoro-phenyl)-butane, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for 72 hours. After cooling the reaction mixture, there are added 70 parts water. The organic layer is separated, dried over potassium carbonate, filtered and evaporated. The oily residue is dissolved in diisopropylether and evaporated again. The solid residue is boiled for a few minutes in 80 parts diisopropylether, filtered hot and dried, yielding a mixture of the free base and the hydrochloride. This fraction is dissolved in a mixture of 48 parts acetone and 4 parts 2-propanol and boiled for a few minutes. To this hot solution is added a solution of 0.8 part oxalic acid dihydrate in 16 parts acetone and the whole is further boiled for awhile. After cooling to room temperature, the formed precipitate is filtered off and dried, yielding dl-1-[3-(4-fluoro-phenyl)-butyl]-4-(2-oxo-1-benzimidazolinyl) - piperidine oxalate; M.P. 215–217° C.

Example XLVI

To a heated mixture (about 45° C.) of 4.9 parts dl-1-(3-phenyl-butyl) - 4 - (2-oxo-1-benzimidazolinyl)-piperidine, 0.4 part trimethylbenzylammoniumhydroxide and 30 parts 1,4-dioxane, are added portionwise 3.12 parts acrylonitrile. After the addition is complete, the whole is stirred for 3 hr., 30 min. at a temperature of about 40–50° C. After cooling, the reaction mixture is evaporated. The oily residue is dissolved in anhydrous ether and gaseous hydrogen chloride is introduced into the solution. The precipitated solid salt is filtered off and recrystallized from 64 parts 2-propanol. After drying for 2 days at 80° C., dl - 1 - (3 - phenyl-butyl)-4-[3-(2-cyano-ethyl)-2-oxo-1-benzimidazolinyl]-piperidine hydrochloride is obtained; M.P. 215–217° C.

Example XLVII

To a warm solution (about 60° C.) of 4.7 parts dl-1-(2 - phenyl-propyl)-4-(2-oxo-1-benzimidazolinyl) - piperidine in 80 parts 2-propanol, are added portionwise 15.5 parts formaldehyde 35%. After the addition is complete, the whole is further stirred and refluxed for 20 hours. After cooling to room temperature, the reaction mixture is filtered and after cooling the filtrate to 0° C., the formed precipitate is filtered off and dried, yielding dl-1-(2-phenyl-propyl) - 4 - [3 - (hydroxy-methyl)-2-oxo-1-benzimidazolinyl]-piperidine; 155–161° C.

Example XLVIII

A mixture of 9.8 parts dl-1-(3-phenyl-butyl)-4-(2-oxo-1-benzimidazolinyl)-piperidine, 20 parts propionic acid anhydride, and 80 parts toluene is stirred and refluxed for 15 hours. After cooling to room temperature, the reaction mixture is alkalized with ammoniumhydroxide. The organic layer is separated, dried and evaporated in vacuo. The oily residue is boiled in 40 parts diisopropylether together with a small part of activated charcoal. After filtration, the filtrate is cooled to −15° C., the solid is filtered off and dried, yielding dl-1-(3-phenyl-butyl)-4-(2 - oxo-3-propionyl-1-benzimidazolinyl)-piperidine; M.P. 82–83° C.

Example XLIX

A mixture of 4.7 parts dl-1-(2-phenyl-propyl)-4-(2-oxo-1-benzimidazolinyl)-piperidine, 10 parts propionic acid anhydride and 40 parts toluene is stirred and refluxed for 15 hours. After cooling the reaction mixture to room temperature, the whole is alkalized with sodium hydroxide solution. The organic layer is separated, dried over potassium carbonate, filtered and evaporated. The solid residue is recrystallized from boiling diisopropylether. After cooling to 0° C., the solid is filtered off and dried, yielding crude dl-1-(2-phenyl-propyl)-4-(2-oxo - 3 - propionyl-1-benzimidazolinyl)-piperidine. This fraction is recrystallized once more from 40 parts dimethylformamide, to yield dl-1-(2-phenyl-propyl)-4-(2-oxo - 3 - propionyl-1-benzimidazolinyl)-piperidine; M.P. 169–171° C.

Example L

To a heated (about 50° C.) and stirred mixture of 4.7 parts dl-1-(2-phenyl-propyl)-4-(2-oxo-1-benzimidazolinyl)-piperidine, 0.4 part trimethylbenzylammoniumhydroxide, and 24 parts 1,4-dioxane, are added portionwise 3.12 parts acrylonitrile, while maintaining the temperature at about 45° C.: slightly exothermic reaction. After the addition is complete, the whole is stirred at the same temperature of 3 hr., 30 min. After cooling to room temperature, the reaction mixture is evaporated in vacuo. The oily residue is dissolved in 40 parts 2-propanol. After cooling this solution to 0° C., the formed precipitate is filtered off and dried, yielding crude dl-1-(2-phenyl-propyl)-4-[3-(2-cyano-ethyl) - 2 - oxo - 1 - benzimidazolinyl]-piperidine. This crop is recrystallized twice, first from 40 parts 2-propanol and then from 24 parts dimethylformamide. After drying for one day at 80° C., dl-1-(2-phenyl-propyl)-4-[3-(2-cyano-ethyl)-2-oxo-1-benzimidazolinyl]-piperidine is obtained; M.P. 155–158° C.

Example LI

Interaction of 1-benzyl-4-[3-(chloromethyl)-2-oxo-1-benzimidazolinyl]-piperidine with potassium cyanide in aqueous ethanol yields 1-benzyl-4-[3-(cyanomethyl)-2-oxo-1-benzimidazolinyl]-piperidine.

Example LII 61 parts dl-1-hydroxy-1-(4-methyl-phenyl)-butane are cooled to 0–5° C. in a mixture of ice-sodium chloride. 60 parts phosphorous tribromide are then added dropwise. After the addition is complete, the mixture is kept overnight at room temperature while stirring. Thereafter it is boiled on a water bath for 1 hour while stirring. Further, the mixture is poured into crushed ice and washed with a solution of 300 parts sodium bicarbonate 10% in 500 parts water, and once more with 500 parts water. It is then dried over sodium sulfate filtered and evaporated, yielding an oily residue of dl-1-bromo-1-(4-methyl-phenyl)-butane.

A mixture of 6 parts dl-1-bromo-1-(4-methyl-phenyl)-butane, 5.6 parts 4-(2-oxo-1-benzimidazolinyl)-piperidine hydrochloride, 7 parts sodium carbonate, a few crystals of potassium iodide and 200 parts 4-methyl-pentanone is stirred and refluxed for 2 days. After cooling, there are added 250 parts water. The organic layer is separated, dried over potassium carbonate, filtered and evaporated in vacuo. The oily residue is dissolved in diisopropylether; the solution is dried over potassium carbonate, filtered and evaporated. The solid residue is recrystallized from a mixture of 80 parts 4-methyl-2-pentanone and 105 parts diisopropylether, yielding dl-[1-(4-methyl-phenyl)-butyl]-4-(2-oxo-1-benzimidazolinyl) - piperidine; M.P. 192.5–195° C.

What is claimed is:

1. A benzimidazolinyl piperidine selected from the group consisting of

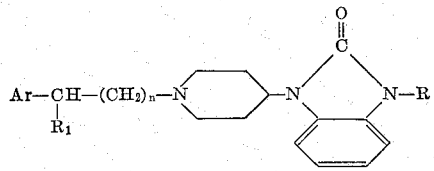

and the therapeutically active non-toxic acid addition salts thereof wherein Ar is a member selected from the group consisting of phenyl and phenyl monosubstituted with a member selected from the group consisting of halo, lower alkyl and lower alkoxy; R is a member selected from the group consisting of hydrogen, lower alkyl, lower alkylcarbonyl, hydroxymethyl, halomethyl, lower alkoxymethyl, cyanomethyl, cyano-Z- and lower alkoxy-carbonyl-Z-, said -Z- being a —$CH(R_2)CH(R_2)$— radical wherein $R_2$ is a member selected from the group consisting of hydrogen and methyl; $R_1$ is a member selected from the group consisting of hydrogen, methyl, ethyl and propyl; and $n$ is an integer from 0 to 4.

2. 1-[1-(mono-halophenyl)-ethyl] - 4 - [3 - (2 - cyano-ethyl)-2-oxo-1-benzimidazolinyl]-piperidine.

3. 1-[2-(mono-halophenyl) - propyl]-4-(2-oxo-1-benzimidazolinyl)-piperidine.

4. 1-[4-(mono-halophenyl)-butyl]-4-(2-oxo - 1 - benzimidazolinyl)-piperidine.

5. 1-[1-(mono-lower alkylphenyl)-ethyl]-4-(2-oxo-1-benzimidazolinyl)-piperidine.

6. 1-[1-(4-chloro-phenyl)-ethyl] - 4 - [3 - (2 - cyano-ethyl)-2-oxo-1-benzimidazolinyl] - piperidine hydrochloride.

7. 1-(1-phenyl-butyl)-4-(2 - oxo - 1 - benzimidazolinyl)-piperidine.

8. 1-[1-(4-methyl-phenyl-ethyl]-4-(2 - oxo - 1 - benzimidazolinyl)-piperidine oxalate.

9. 1-(1-phenyl-ethyl)-4-(2-oxo - 1 - benzimidazolinyl)-piperidine.

10. 1-[4-(4-fluoro-phenyl)-butyl]-4-(2-oxo - 1 - benzimidazolinyl)-piperidine hydrochloride.

11. 1-(4-phenyl - butyl)-4-(2-oxo-1-benzimidazolinyl)-piperidine.

12. 1 - (2 - phenyl - propyl)-4-(2-oxo-1-benzimidazolinyl)-piperidine.

13. 1-[2-(4-fluoro-phenyl) - propyl]-4-(2-oxo-1-benzimidazolinyl)-piperidine oxalate.

No reference cited.

WALTER A. MODANCE, *Primary Examiner.*

A. D. SPEVACK, *Assistant Examiner.*

UNITED STATES PATENT OFFICE
CERTIFICATE OF CORRECTION

Patent No. 3,318,900

May 9, 1967

Paul Adriaan Jan Janssen

It is hereby certified that error appears in the above numbered patent requiring correction and that the said Letters Patent should read as corrected below.

Column 1, line 28, for "-CH($R_2$)CR($R_2$)-" read -- -CH($R_2$)CH($R_2$)- --; column 6, line 3, for "-1-piperidine" read -- -piperidine --; column 9, line 25, for "dl-1-[1-(4-" read -- dl-1-[4- --; column 10, line 71, after "and" insert -- the --; column 20, line 36, for "dl-[1-(4-" read -- dl-1-[1-(4- --; column 21, line 3, for "(4-methyl-phenyl-ethyl]" read -- (4-methyl-phenyl)-ethyl] --.

Signed and sealed this 28th day of November 1967.

(SEAL)
Attest:

Edward M. Fletcher, Jr.
Attesting Officer

EDWARD J. BRENNER
Commissioner of Patents